US008799676B2

United States Patent
Furuhashi

(10) Patent No.: US 8,799,676 B2
(45) Date of Patent: Aug. 5, 2014

(54) MAGNETIC DISK DEVICE AND DATA READ AND WRITE METHOD

(75) Inventor: Kana Furuhashi, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 11 days.

(21) Appl. No.: 13/559,192

(22) Filed: Jul. 26, 2012

(65) Prior Publication Data

US 2013/0275767 A1     Oct. 17, 2013

(30) Foreign Application Priority Data

Apr. 17, 2012    (JP) ................................. 2012-093896

(51) Int. Cl.
    *G06F 12/14*     (2006.01)
    *G06F 13/00*     (2006.01)

(52) U.S. Cl.
    CPC ............ *G06F 12/1408* (2013.01); *G06F 12/14* (2013.01); *G06F 13/00* (2013.01)
    USPC .......................................................... 713/189

(58) Field of Classification Search
    CPC ................................. G06F 12/14; G06F 13/00
    USPC .......................................................... 713/189
    See application file for complete search history.

(56) References Cited

U.S. PATENT DOCUMENTS

| 5,892,826 | A | * | 4/1999 | Brown et al. ................. 713/190 |
| 6,208,476 | B1 | | 3/2001 | Park |
| 8,073,142 | B2 | | 12/2011 | Saga et al. |
| 2012/0063284 | A1 | * | 3/2012 | Mathew et al. ............ 369/53.44 |
| 2012/0105994 | A1 | * | 5/2012 | Bellorado et al. .............. 360/45 |
| 2012/0300341 | A1 | * | 11/2012 | Matsuo et al. ............. 360/77.02 |

FOREIGN PATENT DOCUMENTS

| JP | 05-036215 | 2/1993 |
| JP | 2008-171458 | 7/2008 |
| JP | 2011-018406 | 1/2011 |

* cited by examiner

*Primary Examiner* — Kambiz Zand
*Assistant Examiner* — Aubrey Wyszynski
(74) *Attorney, Agent, or Firm* — Knobbe, Martens, Olson & Bear LLP

(57) ABSTRACT

According to one embodiment, a magnetic disk device includes a read and write channel transfers data to/from a magnetic disk; a data processor cancels an inter-track interference in data read; an encryption decode processor which is provided in common through a write data path and a read data path in the read and write channel and executes an encryption processing and a decode processing for the data to be transferred to/from the magnetic disk; and an encryption decode processing bypass module bypasses the encryption processing or the decode processing through the encryption decode processor in a cancellation of the inter-track interference in the data processor.

14 Claims, 6 Drawing Sheets

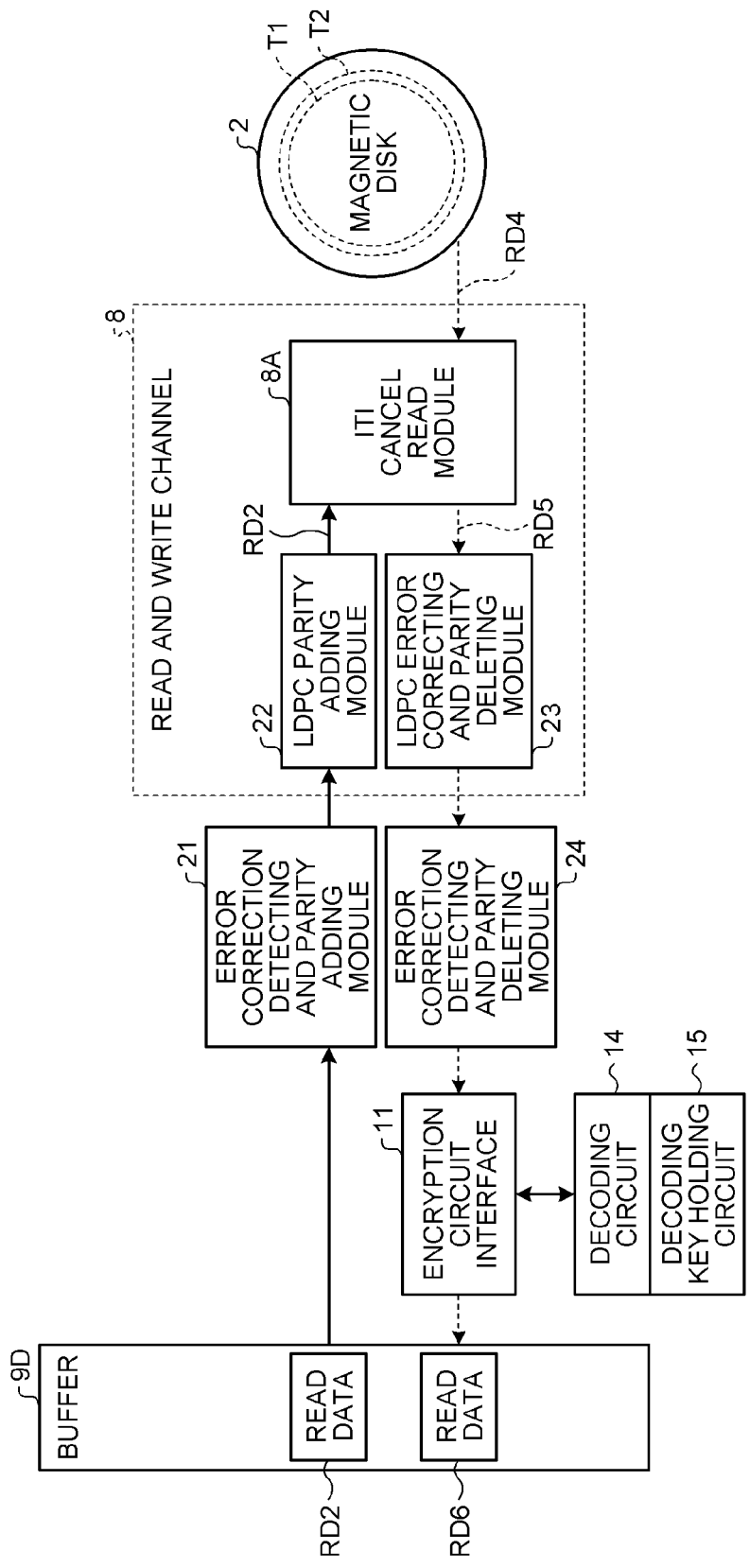

MAGNETIC DISK DEVICE AND DATA READ AND WRITE METHOD

CROSS-REFERENCE TO RELATED APPLICATIONS

This application is based upon and claims the benefit of priority from Japanese Patent Application No. 2012-93896, filed on Apr. 17, 2012; the entire contents of which are incorporated herein by reference.

FIELD

Embodiments described herein relate generally to a magnetic disk device and a data read and write method.

BACKGROUND

Referring to a magnetic disk device, in some cases in which a sector is subjected to an inter-track interference in data read, ITI (Inter Track Interference) cancel read is carried out to relieve the sector. In order to carry out the ITI cancel read over a plurality of sectors on that occasion, it is necessary to separate a write data path and a read data path in such a manner that these paths function at the same time. For this reason, an encryption circuit and an encryption key holding module are provided separately for the write data path and the read data path in the case in which write data are encrypted and written.

BRIEF DESCRIPTION OF THE DRAWINGS

FIG. 7 is a block diagram showing a flow of write data and read data at a time of read in the ITI cancel read according to the second embodiment.

DETAILED DESCRIPTION

In general, according to one embodiment, there are provided a read and write channel, an ITI cancel read module and an encryption processor. The read and write channel transfers data to/from a magnetic disk. The ITI cancel read module cancels an inter-track interference in data read. The encryption processor is provided on a write data path and a read data path in the read and write channel in common and carries out an encryption processing for the data transferred to/from the magnetic disk.

A magnetic disk device and a data read and write method according to embodiments will be described below in detail with reference to the accompanying drawings. The present invention is not restricted to these embodiments.

(First Embodiment)

Figure 1:
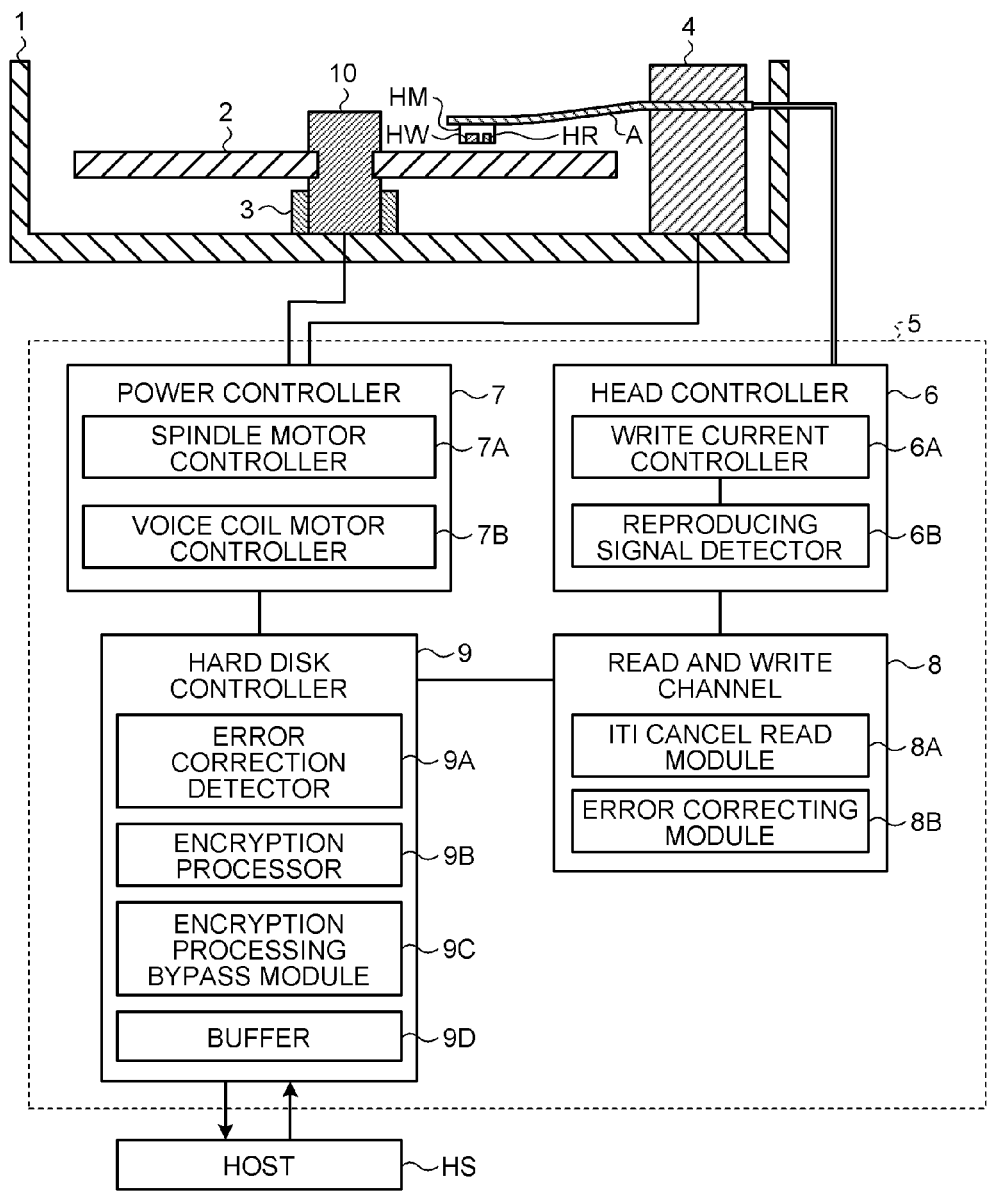
FIG. 1 is a block diagram showing a schematic structure of a magnetic disk device according to a first embodiment.

FIG. 1 is a block diagram showing a schematic structure of a magnetic disk device according to a first embodiment.

In FIG. 1, the magnetic disk device is provided with a magnetic disk 2, and the magnetic disk 2 is supported through a spindle 10.

Moreover, the magnetic disk device is provided with a magnetic head HM, and the magnetic head HM is provided with a write head HW and a read head HR. The write head HW and the read head HR are disposed opposite to the magnetic disk 2. Herein, the magnetic head HM is held on the magnetic disk 2 through an arm A. The arm A can slide the magnetic head HM in a horizontal plane.

Furthermore, a voice coil motor 4 for driving the arm A is provided in the magnetic disk device, and furthermore, a spindle motor 3 for rotating the magnetic disk 2 is provided through the spindle 10. The magnetic disk 2, the magnetic head HM, the arm A, the voice coil motor 4, the spindle motor 3 and the spindle 10 are accommodated in a case 1.

In addition, the magnetic disk device is provided with a magnetic recording controller 5, and the magnetic recording controller 5 is provided with a head controller 6, a power controller 7, a read and write channel 8 and a hard disk controller 9. The head controller 6 is provided with a write current controller 6A and a reproducing signal detector 6B. The power controller 7 is provided with a spindle motor controller 7A and a voice coil motor controller 7B. The read and write channel 8 is provided with an ITI cancel read module 8A and an error correcting module 8B. The hard disk controller 9 is provided with an error correction detector 9A, an encryption processor 9B, an encryption processing bypass module 9C and a buffer 9D.

The head controller 6 can amplify or detect a signal in recording and reproduction. The write current controller 6A can control a write current flowing to the write head HW. The reproducing signal detector 6B can detect a signal read through the read head HR.

The power controller 7 can drive the voice coil motor 4 and the spindle motor 3. The spindle motor controller 7A can control a rotation of the spindle motor 3. The voice coil motor controller 7B can control a driving operation of the voice coil motor 4.

The read and write channel 8 can transfer data between the head controller 6 and the hard disk controller 9. The data can include read data, write data and servo data. For example, the read and write channel 8 can convert a signal reproduced by the read head HR into a data format to be treated by a host HS or can convert data output from the host HS into a signal format to be recorded by the write head HW. Such a format conversion can include a DA conversion and encoding. Moreover, the read and write channel 8 can execute a decode processing for a signal reproduced through the read head HR or can carry out a code modulation over data output from the host HS.

The ITI cancel read module 8A can cancel an inter-track interference in the data read. For example, it is assumed that the magnetic disk 2 is provided with a first track and a second track which are adjacent to each other. It is assumed that the read data are read from the first track and the write data are written to the second track. At this time, the ITI cancel read module 8A can receive the write data from the buffer 9D, and at the same time, can read the read data from the first track and can cancel an interference due to the write data, and can then transmit the read data to the buffer 9D.

Alternatively, it is assumed that first read data are read from the first track and second read data are read from the second track. At this time, when the first read data are read from the first track, they are held in the buffer 9D. The ITI cancel read module 8A may receive the first read data from the buffer 9D, and at the same time, may read second read data from the second track and may cancel an interference due to the first read data, and may then transmit the second read data to the buffer 9D.

It may be decided whether an inter-track interference is caused between the first track and the second track based on the servo data read from the first track or the second track or based on an error rate of the read data which are read from the first track or the second track.

The error correcting module 8B can correct an error of the read data based on redundancy data added to the read data. The error correcting module 8B can use an LDPC (Low Density Parity Check) code, for example. Although there has been shown the case in which the read and write channel 8 is provided with the ITI cancel read module 8A and the error correcting module 8B in the example of FIG. 1, they may be disposed on an outside of the read and write channel 8.

The hard disk controller 9 can carry out recording and reproducing control based on a command sent from the host HS or can transfer data between the host HS and the read and write channel 8.

The error correction detector 9A can detect the error of the read data based on the redundancy data added to the read data. The error correction detector 9A can use a CRC (Cyclic Redundancy Check) code, for example. The encryption processor 9B can carry out an encryption processing for data to be transferred to/from the magnetic disk 2. Herein, the encryption processor 9B can be shared by the write data path and the read data path in the read and write channel 8. The encryption processing bypass module 9C can bypass the encryption processing to be carried out by the encryption processor 9B. The buffer 9D can hold the write data to be written to the magnetic disk 2 or the read data read from the magnetic disk 2.

Although there has been shown the case in which the hard disk controller 9 is provided with the error correction detector 9A, the encryption processor 9B, the encryption processing bypass module 9C and the buffer 9D in the example of FIG. 1, they may be provided on an outside of the hard disk controller 9.

The magnetic recording controller 5 is connected to the host HS. For the host HS, there may be used a personal computer for issuing a write command or a read command to the magnetic disk device or an external interface.

Figure 2:
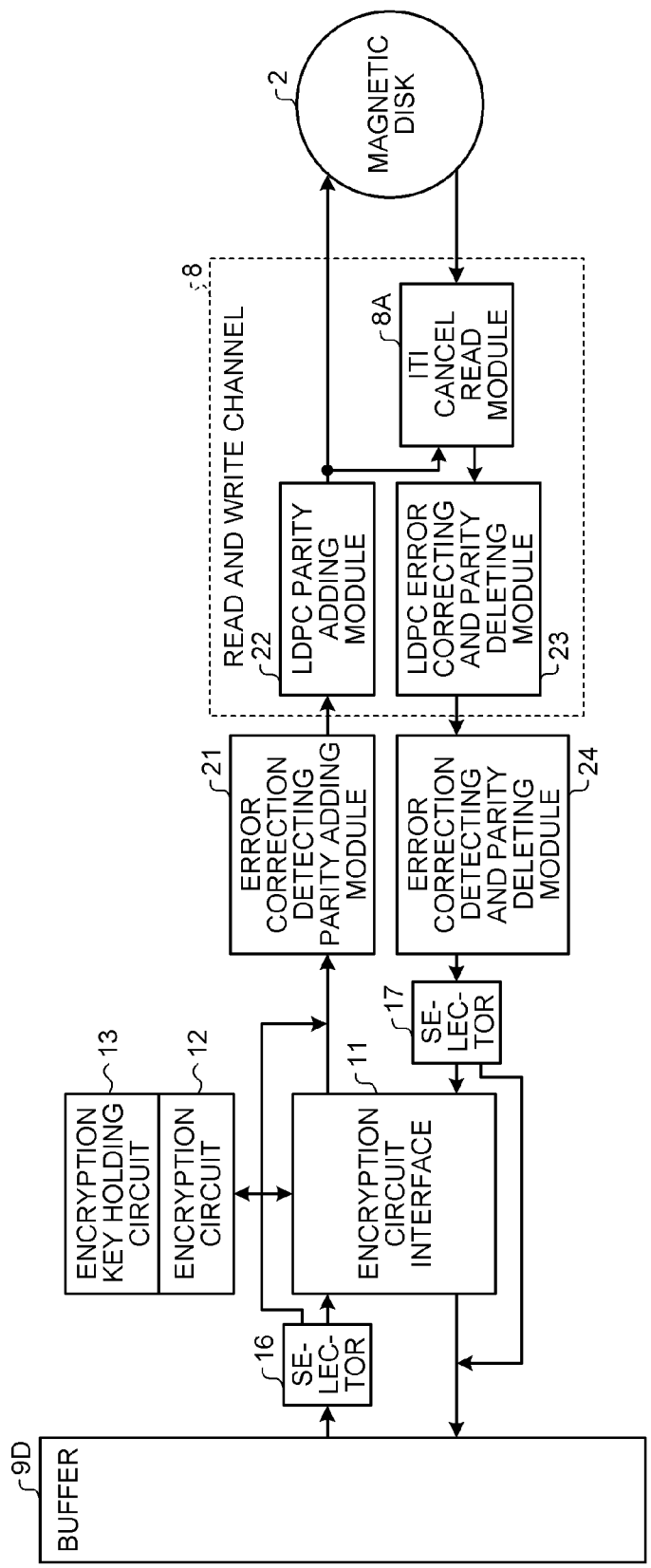
FIG. 2 is a block diagram showing a flow of data in write and read with ITI cancel read in the magnetic disk device illustrated in FIG. 1.

FIG. 2 is a block diagram showing a flow of data in write and read with the ITI cancel read in the magnetic disk device of FIG. 1.

In FIG. 2, an encryption circuit interface 11, an encryption circuit 12 and an encryption key holding circuit 13 are provided as the encryption processor 9B in FIG. 1. The encryption circuit 12 and the encryption key holding circuit 13 can be shared by the write data path and the read data path. The encryption circuit 12 can encrypt the write data. The encryption key holding circuit 13 can hold an encryption key to be used for the encryption. The encryption circuit interface 11 can transfer data between the write data path and the encryption circuit 12 or can transfer data between the read data path and the encryption circuit 12.

Selectors 16 and 17 are provided as the encryption processing bypass module 9C in FIG. 1. The selector 16 can bypass the encryption circuit interface 11 in the write data path. The selector 17 can bypass the encryption circuit interface 11 in the read data path.

As the error correcting module 8B in FIG. 1, there are provided an LDPC parity adding module 22 and an LDPC error correcting and parity deleting module 23. The LDPC parity adding module 22 can add an LDPC parity to the write data. The LDPC error correcting and parity deleting module 23 can carry out an error correction for the read data based on the LDPC parity, and furthermore, can delete the LDPC parity from the read data.

As the error correction detector 9A in FIG. 1, there are provided an error correction detecting parity adding module 21 and an error correction detecting and parity deleting module 24. The error correction detecting parity adding module 21 can add the error correction detecting parity to the write data. The error correction detecting and parity deleting module 24 carries out an error detection for the read data based on the error correction detecting parity, and furthermore, can delete the error correction detecting parity from the read data.

Figure 3:
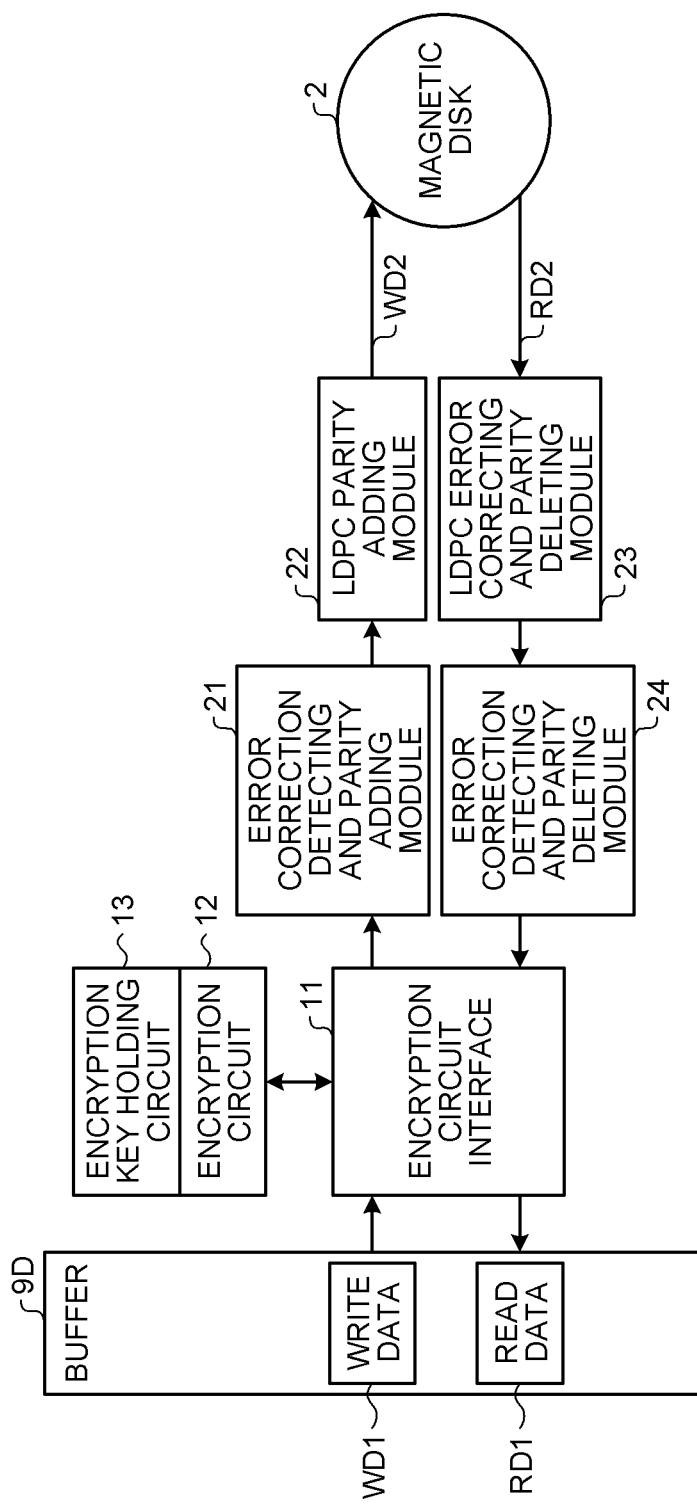
FIG. 3 is a block diagram showing a flow of data in write and read at a time of ITI cancel read release in the magnetic disk device illustrated in FIG. 2.

FIG. 3 is a block diagram showing a flow of data at a time of write and read in ITI cancel read release in the magnetic disk device of FIG. 2. In the ITI cancel read release, the write to the magnetic disk 2 and the read from the magnetic disk 2 are carried out without the ITI cancel read.

In FIG. 3, when a write command is issued from the host HS in FIG. 1, write data WD1 are held in the buffer 9D. It is assumed that the write data WD1 are non-encryption data. An output side of the buffer 9D is connected to an input side of the encryption circuit interface 11 through the selector 16 so that the encryption circuit interface 11 is inserted into the write data path.

When the write data WD1 are transmitted from the buffer 9D to the write data path, then, the write data WD1 are encrypted by the encryption circuit 12 so that write data WD2 are generated and written to the magnetic disk 2. The error correction detecting parity and the LDPC parity may be added to the write data WD2 via the error correction detecting parity adding module 21 and the LDPC parity adding module 22.

On the other hand, when a read command is issued from the host HS in FIG. 1, an output side of the error correction detecting and parity deleting module 24 is connected to an input side of the encryption circuit interface 11 through the selector 17 so that the encryption circuit interface 11 is inserted into the read data path. Then, read data RD2 are read from the magnetic disk 2 and are transmitted to the read data path. It is assumed that the read data RD2 are encrypted data. When the read data RD2 are decoded by the encryption circuit 12, read data RD1 are generated and held in the buffer 9D. In the case in which the error correction detecting parity and the LDPC parity are added to the write data WD2, the read data RD2 may be subjected to an error detection and an error correction via the LDPC error correcting and parity deleting module 23 and the error correction detecting and parity deleting module 24.

Figure 4:
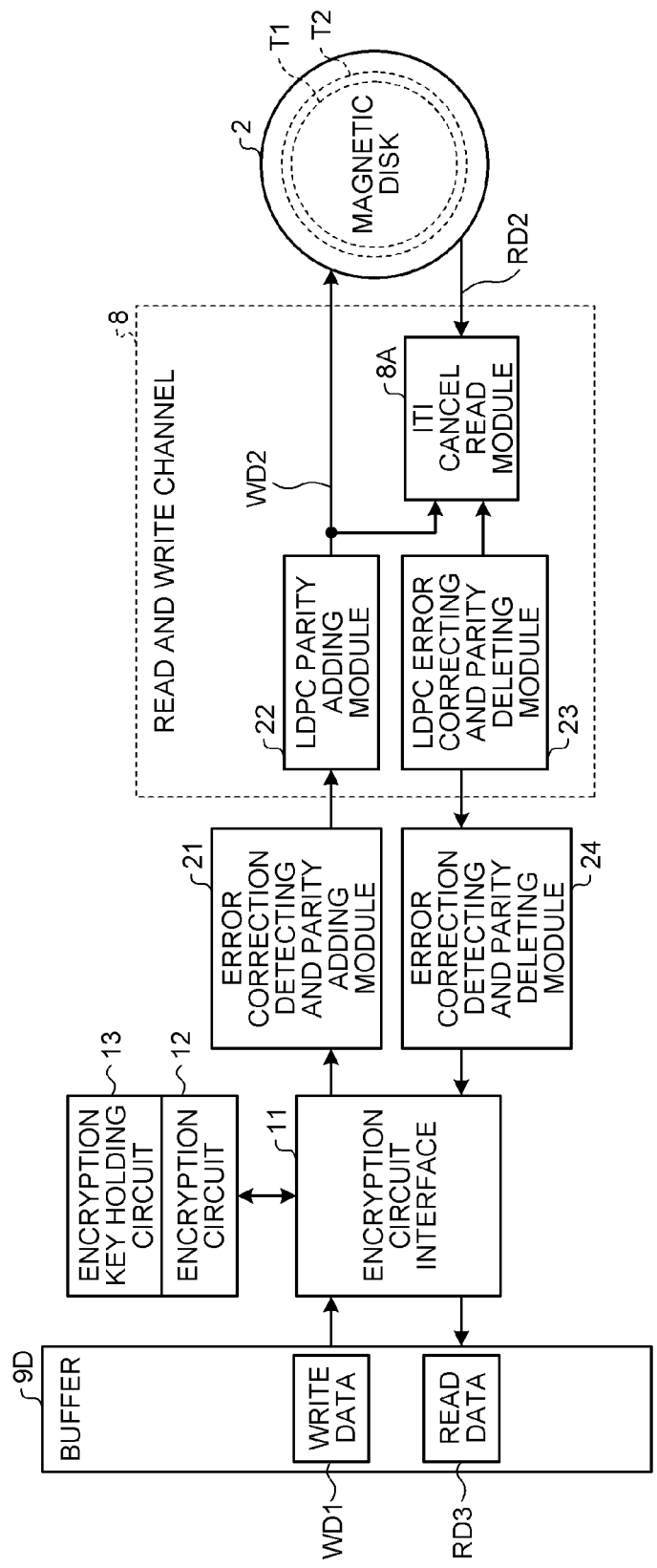
FIG. 4 is a block diagram showing a flow of read data in data write-back with the ITI cancel read in the magnetic disk device illustrated in FIG. 2.

FIG. 4 is a block diagram showing a flow of read data in data write-back with the ITI cancel read in the magnetic disk device of FIG. 2.

In FIG. 4, it is assumed that the magnetic disk 2 is provided with a first track T1 and a second track T2 which are adjacent to each other. It is assumed that the read data RD2 are read from the first track T1 and the write data WD2 are written to the second track T2. At this time, the output side of the buffer 9D is connected to the input side of the encryption circuit interface 11 through the selector 16 so that the encryption circuit interface 11 is inserted into the write data path. Moreover, the output side of the error correction detecting and parity deleting module 24 is connected to that of the encryption circuit interface 11 through the selector 17 so that the encryption circuit interface 11 is bypassed in the read data path. When write data WD1 are transmitted from the buffer 9D to the write data path, they are encrypted through the encryption circuit 12 so that the write data WD2 are generated and written to the second track T2.

In the case in which an inter-track interference is detected when the write data WD2 are written to the second track T2, the write data WD2 on the write data path are transmitted to the ITI cancel read module 8A. An error correction detecting parity and an LDPC parity may be added to the write data WD2 via the error correction detecting parity adding module 21 and the LDPC parity adding module 22.

Moreover, the read data RD2 are read from the first track T1 onto the read data path and are transmitted to the ITI cancel read module 8A. When the write data WD2 are cancelled from the read data RD2 in the ITI cancel read module 8A, then, read data RD3 are generated and maintained to be encrypted, and are thus held in the buffer 9D. In the case in which the error correction detecting parity and the LDPC parity are added to the write data WD2, the read data RD3 may be subjected to an error detection and an error correction via the LDPC error correcting and parity deleting module 23 and the error correction detecting and parity deleting module 24.

Figure 5:
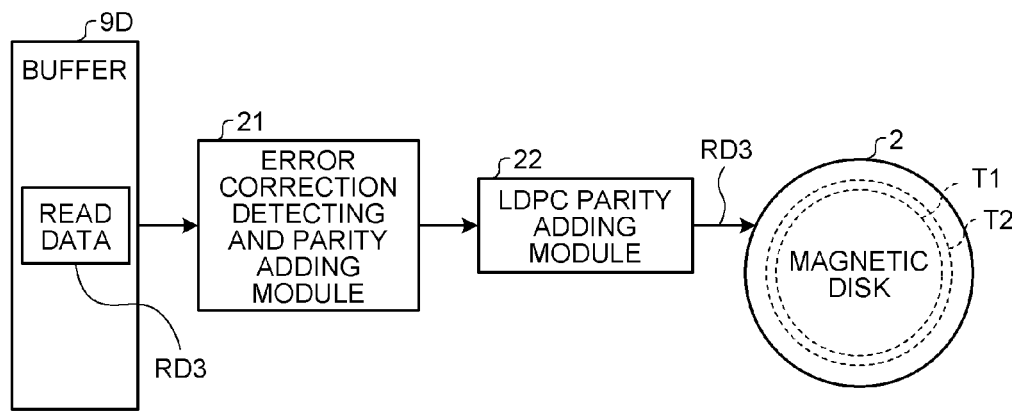
FIG. 5 is a block diagram showing a flow of write data at a time of the write-back in the ITI cancel read in the magnetic disk device illustrated in FIG. 2.

FIG. 5 is a block diagram showing a flow of write data at a time of the write-back in the ITI cancel read in the magnetic disk device of FIG. 2.

In FIG. 5, in the case in which the read data RD3 are written back to the first track T1, the output side of the buffer 9D is connected to that of the encryption circuit interface 11 through the selector 16 so that the encryption circuit interface 11 is bypassed in the write data path. When the read data RD3 are transmitted from the buffer 9D to the write data path, then, the read data RD3 are not encrypted in the encryption circuit 12 but written to the first track T1.

Herein, the interference of the write data WD2 is cancelled in the read data RD3. Also in the case in which the read data RD2 are subjected to the interference of the write data WD2, therefore, the read data RD3 having no interference of the write data WD2 can be written to the first track T1.

By transmitting the read data RD3 to the buffer 9D with the encryption, moreover, it is not necessary to decode the read data RD3. For this reason, also in the case in which the encryption circuit 12 is shared by the write data path and the read data path, the encryption circuit 12 can be assigned to the encryption of the write data WD1. Consequently, it is possible to generate the write data WD2 obtained by encrypting the write data WD1. As a result, also in the case in which the write data WD2 are written to the second track T2, the write data WD2 can be cancelled from the read data RD2 in the ITI cancel read module 8A. Thus, it is possible to support the ITI cancel read which refers to the write data WD2.

By sharing the encryption circuit 12 and the encryption key holding circuit 13 through the write data path and the read data path, moreover, it is not necessary to separately provide the encryption circuit 12 and the encryption key holding circuit 13 in the write data path and the read data path. Consequently, it is possible to reduce the circuit scale and power consumption of the encryption circuit 12 and the encryption key holding circuit 13.

(Second Embodiment)

Figure 6:
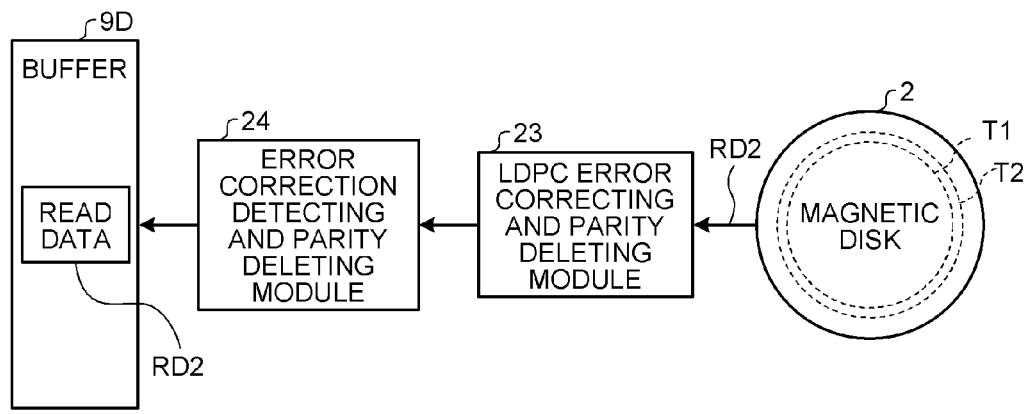
FIG. 6 is a block diagram showing a flow of read data in ITI cancel read according to a second embodiment.

FIG. 6 is a block diagram showing a flow of read data in ITI cancel read according to a second embodiment and FIG. 7 is a block diagram showing a flow of write data and read data at a time of read in the ITI cancel read according to the second embodiment.

In FIG. 7, a decoding circuit 14 and a decoding key holding circuit 15 are provided as the encryption processor 9B of FIG. 1 in place of the encryption circuit 12 and the encryption key holding circuit 13 in FIG. 2. The others can be constituted in the same manner as in FIG. 2.

In FIG. 6, it is assumed that a magnetic disk 2 is provided with a first track T1 and a second track T2 which are adjacent to each other. It is assumed that read data RD2 are read from the first track T1 and read data RD4 are read from the second track T2. An error correction cannot be carried out when the read data RD4 are read. For this reason, it is assumed that an inter-track interference is caused between the first track T1 and the second track T2.

At this time, an output side of an error correction detecting and parity deleting module 24 is connected to that of an encryption circuit interface 11 through a selector 17. Therefore, the encryption circuit interface 11 is bypassed in a read data path.

Then, the read data RD2 are read from the first track T1 onto the read data path, and are maintained to be encrypted and are thus held in a buffer 9D. In the case in which an error correction detecting parity and an LDPC parity are added to the read data RD2, an error detection and an error correction may be carried out via an LDPC error correcting and parity deleting module 23 and the error correction detecting and parity deleting module 24.

In FIG. 7, when the read data RD2 are then encrypted and are held in the buffer 9D in this condition, an output side of the buffer 9D is connected to that of the encryption circuit interface 11 through a selector 16 so that the encryption circuit interface 11 is bypassed in a write data path. Moreover, an output side of the error correction detecting and parity deleting module 24 is connected to an input side of the encryption circuit interface 11 through a selector 17 so that the encryption circuit interface 11 is inserted into the read data path.

Thereafter, the read data RD2 are transmitted from the buffer 9D to a write data path, and the read data RD2 on the write data path are transmitted to an ITI cancel read module 8A. The error correction detecting parity and the LDPC parity may be added to the read data RD2 via an error correction detecting parity adding module 21 and an LDPC parity adding module 22.

Moreover, the read data RD4 are read from the second track T2 onto the read data path and are transmitted to the ITI cancel read module 8A. Subsequently, the read data RD2 are cancelled from the read data RD4 in the ITI cancel read module 8A so that read data RD5 are generated and transmitted to the read data path. Then, the read data RD5 are decoded in the decoding circuit 14 so that read data RD6 are generated and held in the buffer 9D. In the case in which the error correction detecting parity and the LDPC parity are added to the read data RD5, the read data RD5 may be subjected to the error detection and the error correction via the LDPC error correcting and parity deleting module 23 and the error correction detecting and parity deleting module 24.

In the read data RD6, an interference of the read data RD2 is cancelled. Also in the case in which the read data RD4 are subjected to the interference of the read data RD2, therefore, the read data RD6 having no interference of the read data RD2 can be read from the second track T2.

By maintaining the read data RD2 to be encrypted and transmitting the read data RD2 to the buffer 9D, moreover, it is not necessary to encrypt the read data RD2. For this reason, also in the case in which the decoding circuit 14 is shared by the write data path and the read data path, the decoding circuit 14 can be assigned to the decode of the read data RD5 so that the read data RD6 obtained by decoding the read data RD5 can be generated. Also in the case in which the read data RD4 are encrypted, moreover, the read data RD2 can be cancelled from the read data RD4 in the ITI cancel read module 8A so that it is possible to support the ITI cancel read referring to the read data RD2.

By sharing the decoding circuit 14 and the decoding key holding circuit 15 through the write data path and the read data path, furthermore, it is not necessary to separately provide the decoding circuit 14 and the decoding key holding circuit 15 through the write data path and the read data path. Consequently, it is possible to reduce the circuit scale and power consumption of the decoding circuit 14 and the decoding key holding circuit 15.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a read and write channel configured to transfer data to and from a magnetic disk, data stored in the magnetic disk being in encrypted state;
a buffer configured to store write data to be written to the magnetic disk and read data read out from the magnetic disk;
a cipher processor coupled to a write data path and a read data path of the read and write channel and configured to encrypt and decrypt data to be transferred to and from the magnetic disk;
a data processor configured to cancel an inter-track interference by reading data on the read path from an adjacent track to a track where write data to be written and concurrently receiving the write data encrypted by the cipher processor on the write path from the buffer, data read out from the adjacent track to be written back to the magnetic disk; and
a bypass module configured to bypass an encryption process and a decryption process of the cipher processor with respect to data read out from the adjacent track when the inter-track interference is cancelled by the data processor.

2. The magnetic disk device of claim 1, wherein
the data processor is configured to read data from the adjacent track to the track to which write data are written while receiving the write data from the buffer, and to cancel an interference of the write data and then to transmit the read data to the buffer.

3. The magnetic disk device of claim 2, wherein the read data are encrypted, the write data is configured to be encrypted by the cipher processor and to be then transmitted to the data processor, and the read data from which the interference of the write data is cancelled by the data processor are transmitted to the buffer in encrypted state by bypassing the decryption process by the cipher processor.

4. The magnetic disk device of claim 3, wherein write data is configured to be encrypted by the cipher processor and to be then written to the magnetic disk in a write processing for a write command from a host, and
read data read from the magnetic disk is configured to be decrypted by the cipher processor and to be then transmitted to the buffer in a read processing for a read command from the host.

5. The magnetic disk device of claim 1, wherein
the data processor is configured to transmit, to the buffer, first read data read from a first track of the magnetic disk, to read second read data from a second track adjacent to the first track while receiving the first read data from the buffer, and to cancel an interference of the first read data and then to transmit the second read data to the buffer.

6. The magnetic disk device of claim 5, wherein the decryption process of the cipher processor is configured to be bypassed so that the first read data read from the magnetic disk is configured to be maintained in encrypted state and then transmitted to the buffer.

7. The magnetic disk device of claim 6, wherein the encryption process of the cipher processor is configured to be bypassed so that the first read data is configured to be maintained in encrypted and to be thus transmitted to the data processor, and the second read data from which the interference of the first read data is cancelled by the data processor decrypted by the cipher processor and to be then transmitted to the buffer.

8. A data read and write method by a magnetic disk device comprising:
transferring data to and from a magnetic disk by using a read and write channel, data stored in the magnetic disk being in encrypted state;
storing data to be written to the magnetic disk and read data out from the magnetic disk in a buffer;
encrypting and decrypting data to be transferred to and from the magnetic disk in a write data path and a read data path of the read and write channel;
cancelling an interference by reading data on the read path from an adjacent track to a track where write data to be written and concurrently receiving the write data in encrypted state on the write path from the buffer, data read out from the adjacent track to be written back to the magnetic disk; and
bypassing the encrypting and decrypting with respect to data read out from the adjacent track when the inter-track interference is cancelled.

9. The data read and write method of claim 8, further comprising:
reading data from the adjacent track to the track to which write data are written while receiving the write data from the buffer, and cancelling an interference of the write data and then transmitting the read data to the buffer.

10. The data read and write method of claim 9, further comprising:
encrypting the write data, and transmitting the read data, from which the interference of the write data is cancelled, to the buffer in encrypted state by bypassing the encrypting and decrypting.

11. The data read and write method of claim 10, further comprising:
encrypting write data, writing the encrypted write data to the magnetic disk in a write processing for a write command from a host; and
decrypting read data read from the magnetic disk and then transmitting to the buffer in a read processing for a read command from the host.

12. The data read and write method of claim 8, further comprising:
transmitting, to the buffer, first read data read from a first track of the magnetic disk, reading second read data from a second track adjacent to the first track while receiving the first read data from the buffer, and cancelling an interference of the first read data and then transmitting the second read data to the buffer.

13. The data read and write method of claim 12, further comprising:
    bypassing the decrypting so that the first read data read from the magnetic disk is configured to be maintained in encrypted state and to be then transmitted to the buffer.

14. The data read and write method of claim 13, further comprising:
    bypassing the encrypting so that the first read data is configured to be maintained in encrypted state, and decrypting the second read data and transmitting to the buffer, the interference of the encrypted first read data being cancelled from the second read data.

\* \* \* \* \*